United States Patent [19]

Banner et al.

[11] Patent Number: 4,956,910

[45] Date of Patent: Sep. 18, 1990

[54] ARMATURE ASSEMBLY METHOD

[75] Inventors: Alvin C. Banner, Montgomery County; Gary E. Clemenz, Greene County; Frank D. Varecka, Monroe County; Ballard E. Walton, Montgomery County, all of Ohio

[73] Assignees: Globe Products Inc., Dayton, Ohio; General Motors Corporation, Detroit, Mich.

[21] Appl. No.: 345,219

[22] Filed: Apr. 28, 1989

Related U.S. Application Data

[62] Division of Ser. No. 203,378, Jun. 3, 1988, abandoned.

[51] Int. Cl.⁵ .............................. H02K 15/00
[52] U.S. Cl. .......................... 29/593; 29/598
[58] Field of Search .......... 29/705, 714, 718, 732–736, 29/597, 598, 593

[56] References Cited

U.S. PATENT DOCUMENTS 1,690,322 11/1928 Baker .
3,579,771 5/1971 Schuette .
3,624,890 12/1971 Schuette .
3,818,570 6/1974 DelBono .
3,911,563 10/1975 Anderson .
4,293,805 10/1981 Warner .
4,577,399 3/1986 Ott .

FOREIGN PATENT DOCUMENTS 705577 12/1979 U.S.S.R. .

Primary Examiner—Carl E. Hall
Attorney, Agent, or Firm—Roger S. Dybvig

[57] ABSTRACT

An armature core subassembly and a commutator to be assembled thereon are each centered on a common axis and rotated relative to one another until a desired angular alignment is obtained between a side edge of a commutator bar and the armature core slots. This orientation is maintained while the commutator is advanced to and pressed onto the armature shaft. A commutator placing machine is described in which a tang-oriented commutator is loaded into the nosepiece of a ram assembly and the ram assembly is rotated by a stepper motor until an edge of a commutator bar is detected at a predetermined location by an optical edge detector. Prior machines for tang-orientation and orientation by insulating gaps between commutator bars are also described.

19 Claims, 5 Drawing Sheets

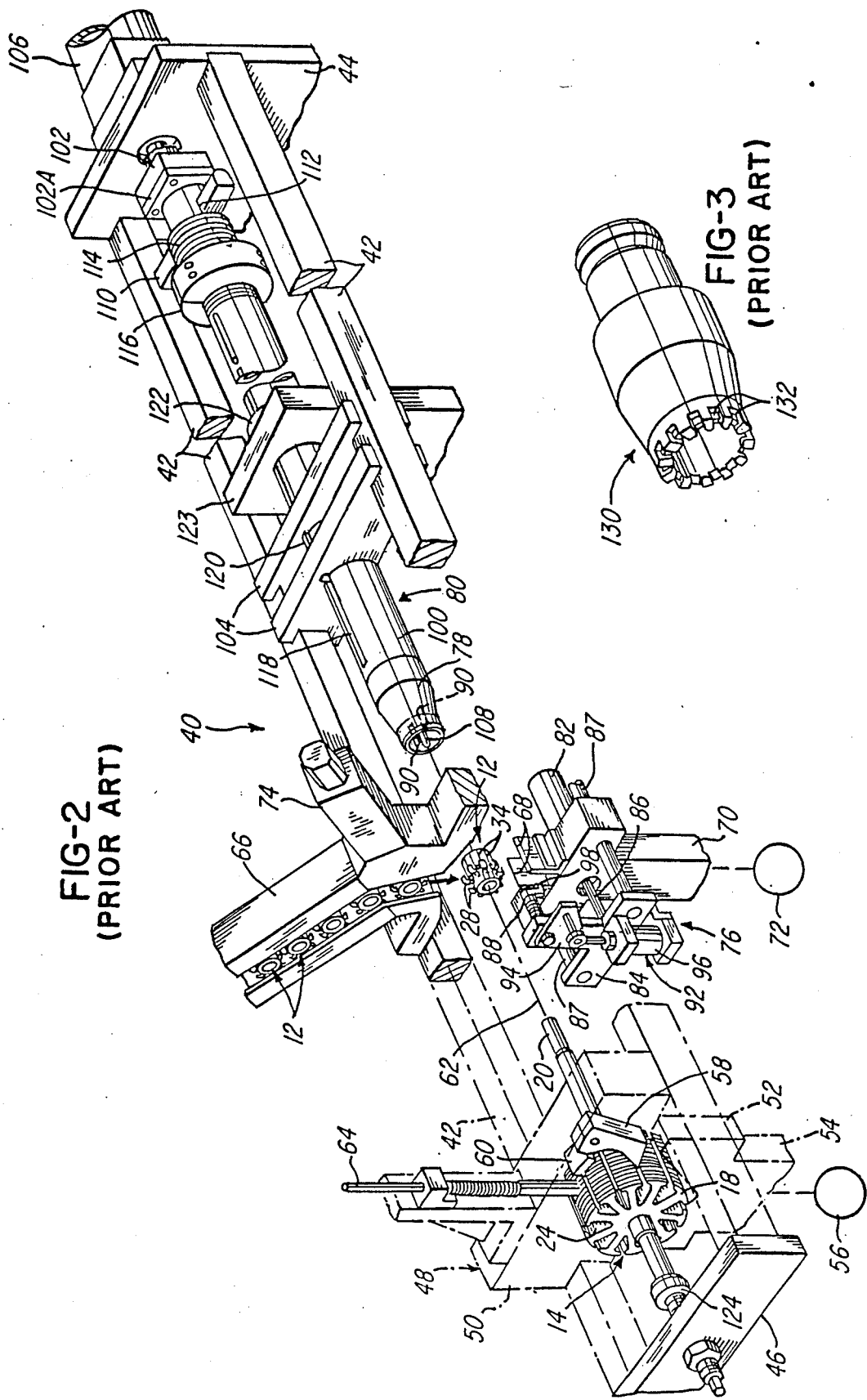

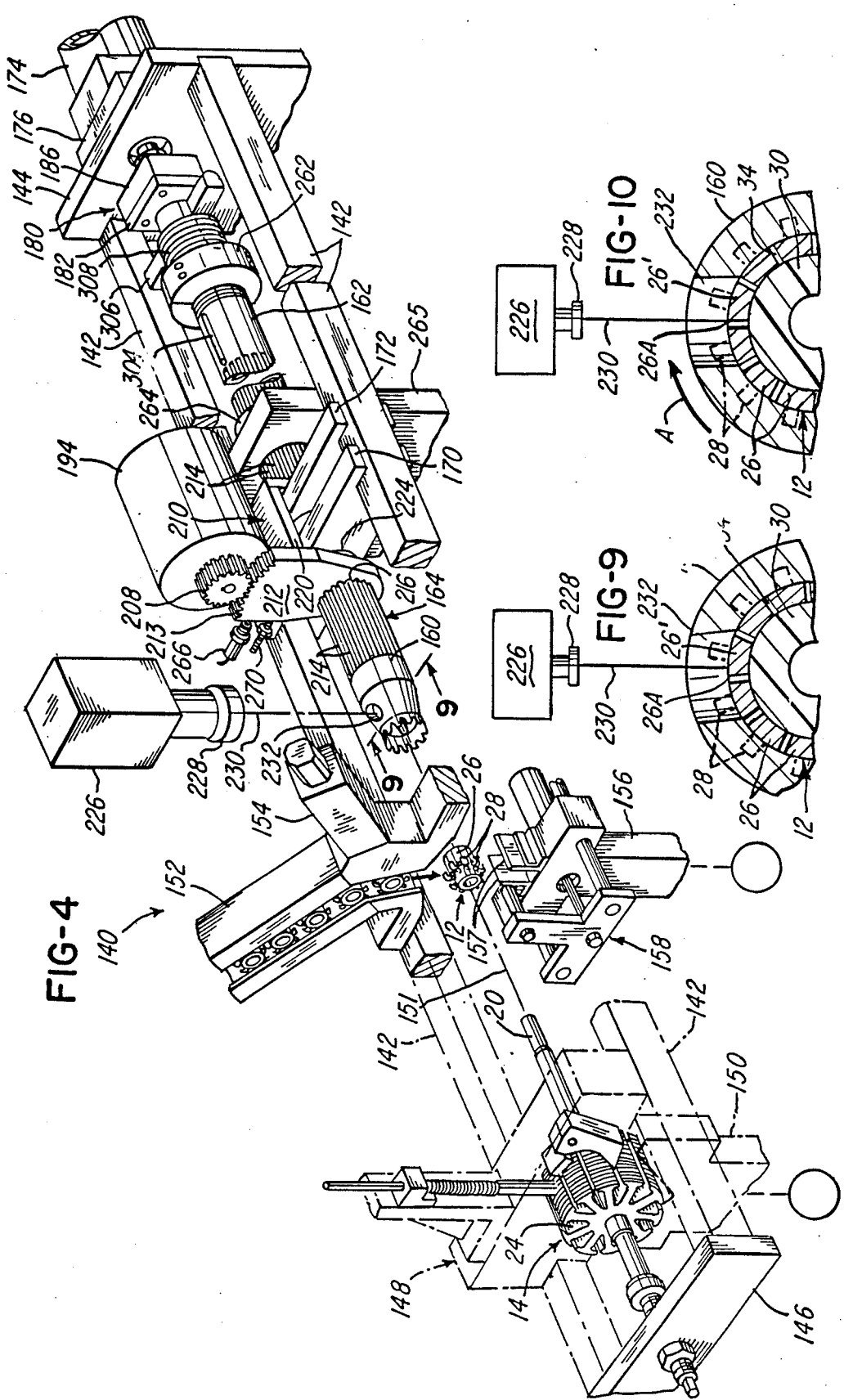

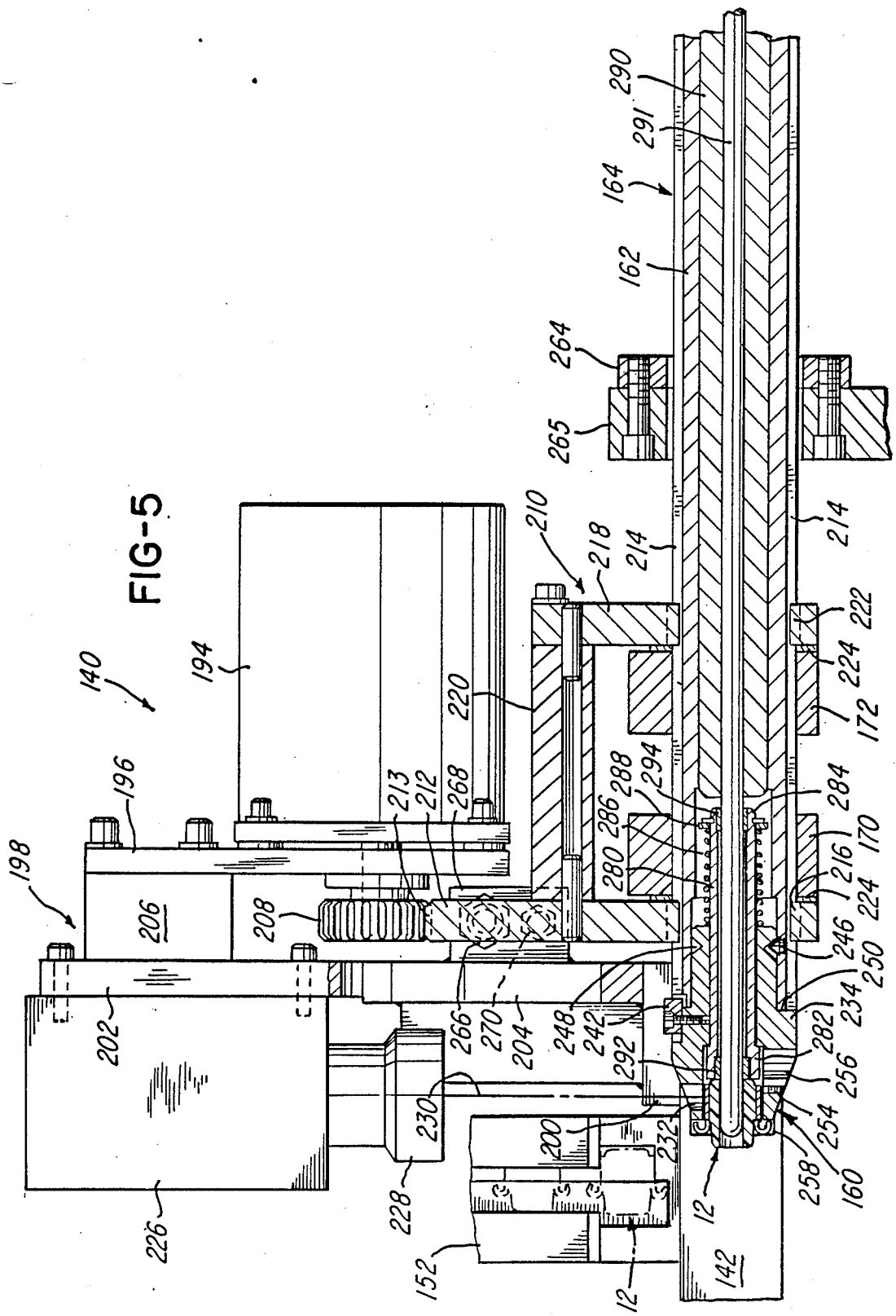

ARMATURE ASSEMBLY METHOD

This is a divisional of co-pending application Ser. No. 203,378, filed on June 6, 1988, now abandoned.

SUMMARY OF THE INVENTION

This invention relates to an armature assembly method and apparatus and more particularly to the assembly of a commutator onto an armature shaft on which an armature core has been previously assembled. However, aspects of this invention may also be useful in other manufacturing processes.

The method and apparatus of this invention may be used for assembling armatures of various types and sizes of motors, but are primarily intended for use in connection with the manufacture of armatures used in fractional horsepower universal motors. In manufacturing this type of armature, a subassembly, hereafter called an "armature core subassembly," is first assembled by pressing a stack of laminations forming an armature core onto an armature shaft. Thereafter, in an operation called "commutator placing," a commutator is pressed onto the shaft in a predetermined axial and angular orientation relative to the armature core.

The armature core has plural, circumferentially spaced, radially extending, and outwardly open coil-receiving slots and the commutator has plural, circumferentially-spaced, rectangular segments or bars. The commutator bars are mounted on a cylindrical body of insulating material, such as plastic, having a through-bore of a size to be press-fit onto the armature shaft. The side edges of each adjacent pair of the commutator bars are separated by an insulating slot which may constitute an air gap or may be filled with insulating material. Each bar has a wire lead-receiving portion, usually either a slot or a hook-like tang, at its end nearest the armature core. The wire lead-receiving portions are provided for connection of terminal wires of each coil which are wound at a later stage of manufacture in a pair of the coil-receiving core slots. As will become apparent, this invention is primarily intended for use with commutators having tangs but, as will be described later on, may be used with commutators having slots instead of tangs.

A commutator must be located in a predetermined or nominal axial and angular orientation relative to the armature core and its coil-receiving slots, as determined by the designer or manufacturer of the motor with which the assembled armature is to be used. Unless the proper orientation is obtained, the armature may have to be scrapped since subsequent manufacturing operations may be seriously hampered and the performance of the motor using the armature may suffer.

A common practice when assembling a commutator having tangs onto an armature core subassembly is to fixedly clamp the armature core subassembly in a position wherein the armature shaft is centered on a predetermined axis (hereafter called the "armature axis") and the armature core slots are fixedly oriented at a predetermined angle relative to a plane passing through the armature axis. The commutator is centered on the same armature axis with its tangs also fixedly oriented at a predetermined angle relative to the same plane passing through such axis at which they are angularly positioned relative to the armature core slots as determined by the motor manufacturer or designer. The commutator is retained in this orientation and advanced along the armature axis by a power operated ram mechanism toward the armature core until the commutator is pressed onto the armature shaft. This practice assures that the tangs are properly oriented for subsequent coil winding and other processing operations. For convenience, commutators oriented by their tangs and armatures using them are hereinafter referred to as being "tang oriented."

Armatures assembled with tang-oriented commutators are often fully satisfactory for their intended purpose. However, the performance of motors having tang-oriented armatures may suffer if the commutator tangs are not accurately located with respect to the side edges of their respective commutator bars. In such cases, tang-orientation results in the tangs being properly oriented but the commutator bars, which control motor commutation, are not properly oriented. Thus, it can be that, for a given batch of commutators, the commutator tangs of each are uniformly circumferentially spaced from one another and the commutator bars of each are uniformly spaced from one another but the commutator tangs are not uniformly spaced from their associated commutator bar side edges. Some commutators of the batch may have tangs centered between the side edges of the bars but other commutators may have tangs closer to one side edge or the other. The lack of uniformity in the location of the tangs on their bars may result in the production of armatures which are unsatisfactory for their intended use.

Since tang-orientation is not always reliable, at least one machine has been developed for orienting commutators based on the orientation of insulating air gaps between two pairs of commutator bars. The method of obtaining the orientation of the insulating gaps is to initially tang-orient the commutator and then attempt to insert it into a commutator-retaining fixture having thin blades positioned to be received by a pair of the insulating gaps. If the location of the tangs of a commutator on their bars is nominal or as designed, and the insulating gaps that are to receive the thin blades are within tolerance and unobstructed by burrs or the like, the commutator readily slips into the retaining fixture. If it does not, the machine is provided with a rocking mechanism that pivots the commutator a few degrees in each direction from nominal while the loading mechanism continues to push the commutator toward the retaining fixture. If this process fails to result in the loading of the commutator into the retaining fixture, the commutator is rejected and the process repeated with a different commutator. This process can only work with commutators in which the insulating slots between bars are air gaps and is called "gap-orientation" herein. In terms of the accuracy of the location of the commutator bars to the armature core slots, gap-orientation is superior to tang-orientation. However, gap-orientation has faults, particularly because of the substantial number of commutators which must be rejected and the production time wasted as a result of the need to repeat the loading procedures. Another problem is that thin blades are easily damaged and need frequent repair or replacement. Further, a substantial number of defective armatures may be produced before the damage is discovered.

There have been commutator placing machines in which a commutator is rotated by a pawl which enters an insulating air gap between a pair of commutator bars until an edge of a commutator bar engages a stop dog. This creates a commutator orientation referred to herein as "bar-edge orientation". The bar edge-oriented commutator is loaded into a ram nosepiece having a thin blade that enters one of the insulating air gaps between a pair of commutator bars. The commutator bars of a bar edge-oriented commutator should be optimally oriented with respect to the armature core. (In the machine described above, the accuracy may be diminished when the commutator is loaded into the nosepiece since it then becomes effectively gap-oriented.) This type of bar edge-orientation is most useful with commutators having relatively large insulating air gaps between bars because of the need to insert a pawl and a stop dog into the air gaps without injuring the bars, the pawl, or the stop dog. It would not be useful for commutators used in most fractional horsepower motors which typically have quite narrow insulating slots between bars. Of course, it could not be used with commutators having insulating slots filled with a solid insulating material or that are otherwise obstructed.

The need exists for an improved method and apparatus for rapidly assembling commutators onto armature core sub-assemblies with the commutator bars accurately angularly located with respect to the armature core slots, and it is the primary object of this invention to provide such method and apparatus.

Since commutator placing occurs at an early stage in the production of armatures and motors using the armatures, delays in the placing operations can seriously set back an entire motor production line or plant. Another object of this invention is to provide a commutator placing method and apparatus by which commutators may be placed rapidly and without excessive rejects resulting from the type of placing method being used.

Another object of this invention is to provide a commutator placing method and apparatus which is effective to angularly orient commutator bars relative to armature core slots which may be useful with commutators having insulating slots between bars which are either air gaps or are filled with insulating material.

Because manufacturing processes cannot be so precise as to completely avoid the introduction of imperfections, many circumstances may arise in which the angular position of a commutator relative to an armature may need to be changed before placement of the commutator onto the shaft. For example, the application of statistical process control techniques may reveal that a given type of commutator should be rotated by one-half degree from the predicted nominal before placement. A change of motor parameters may also require a change in the angular orientation of a commutator relative to the armature core slots. To change the orientation with an existing commutator placing machine is a difficult and time consuming matter and usually requires a service technician familiar with the construction and operation of the commutator placing machine.

Therefore, a further object of this invention is to provide a commutator placing method and apparatus wherein the angular orientation of a commutator may be accurately determined and easily and rapidly adjusted.

In accordance with this invention, an armature core subassembly and a commutator to be assembled thereon are each centered on a common axis and tang-oriented relative to one another and then bar edge-oriented by the location of a side edge of a specific commutator bar. The bar edge-orientation is maintained while the commutator is advanced to and pressed on the armature core.

The location of a commutator bar edge may be obtained by rotating the commutator and an edge detector relative to one another about the armature axis and rotating the commutator and the armature core subassembly relative to one another through a predetermined angle based on the angle of relative rotation between the edge detector and the commutator.

In the preferred practice of this invention, the tang-oriented commutator is loaded into a commutator retaining fixture and the fixture is rotated until an edge of a commutator bar is detected at a predetermined location. When using a machine in which the commutator retaining fixture is a ram nosepiece, the entire ram assembly may be rotated. Accordingly, the commutator is rotated relative to the edge detector at the same time as it is being rotated relative to the armature core subassembly.

Further in accordance with a presently preferred form of this invention, the tang-oriented commutator is intentionally oriented in a home or start position wherein the edge of the commutator bar to be detected is most likely to be in a location of slight misalignment relative to the armature core slots. Accordingly, some rotation of the commutator will be necessary to obtain the desired bar edge-orientation. By this method any commutator within a relatively high range of tolerances will be quickly bar edge-oriented.

A programmable high resolution optical edge detector is preferably used to detect the location of the commutator bar edge and the ram assembly is preferably rotatably driven by a stepper drive motor by means of a rotary motion transfer assembly keyed as by splines to the ram assembly.

Other objects and advantages will become apparent from the following description and the drawings.

BRIEF DESCRIPTION OF THE DRAWINGS

FIG. 2 is a simplified, partly diagrammatic, perspective view, with parts broken away, of a prior art armature assembly machine.

FIG. 3 is a perspective view of a prior art commutator-holding nosepiece forming part of another prior art armature assembly machine.

FIG. 4 is a simplified, perspective view, with parts broken away, of an armature assembly machine in accordance with a preferred embodiment of this invention.

FIG. 5 is a fragmentary cross sectional view of a portion of the assembly machine of FIG. 4.

FIG. 9 is a fragmentary, diagrammatic, cross sectional view of a commutator and a portion of the machine of FIG. 4 taken on line 9—9 of FIG. 4. FIG. 9 also shows the commutator tangs by phantom lines.

FIG. 10 is a fragmentary, diagrammatic, cross sectional view of the same parts as FIG. 9, but at a different stage in the operation of the machine.

DETAILED DESCRIPTION

Introduction

This description begins with a description of a typical armature core subassembly and a commutator with which this invention may be used. In the section following the heading "Prior Art," a machine 40 used to produce gap-oriented armatures, and its method of operation, are described. The production of tang-oriented armatures is also discussed in this section. The method and apparatus of this invention are then discussed under the heading "The Invention." Many of the mechanisms used in a machine, designated 140, made in accordance with this invention are also used in the prior art machines. An effort is made not to needlessly repeat details of such mechanisms, and some parts found in the prior art are described in greater detail in connection with the description of the machine 140.

ARMATURE CORE SUBASSEMBLY AND COMMUTATOR

Figure 1:
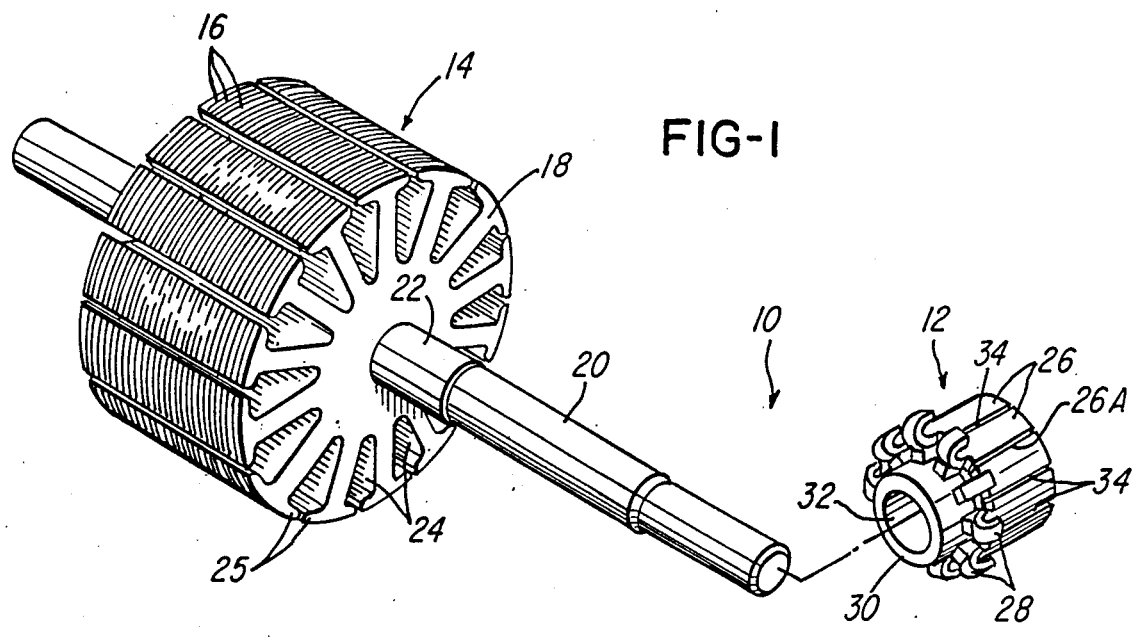
FIG. 1 is an exploded perspective view of the parts of an armature which are to be assembled in accordance with this invention.

FIG. 1 illustrates a well-known type of armature core assembly, generally designated 10, comprising a commutator 12 and an armature core subassembly 14. Subassembly 14 comprises a stack of laminations 16 forming an armature core 18 pressed on an armature shaft 20 and insulating sleeves or coatings 22 surrounding the shaft 20 adjacent both ends of the core 18. The armature core 18 has plural, circumferentially spaced, radially extending, and outwardly open coil-receiving slots 24 between radially extending core teeth 25.

The commutator 12 has plural, circumferentially spaced rectangular segments or bars 26, each bar 26 having a hook or tang 28 at its end nearest the armature core 18 for connection of terminal wires (not shown) of each of the coils (not shown) which are wound at a later stage of manufacture in pairs of the coil-receiving core slots 24. The commutator bars 26 are mounted on a cylindrical body 30 of insulating material, such as plastic, having a through-bore 32 with a diameter sized to be press-fit onto the armature shaft 20. The longitudinally-extending side edges 26A of each adjacent pair of the commutator bars 26 are separated by an insulating slot 34 which may constitute an air gap or which may be filled with an insulating material.

PRIOR ART MACHINES

With reference to FIG. 2, an armature assembly machine for producing gap-oriented armatures is generally designated 40. Machine 40 comprises a pair of parallel, horizontal support bars 42 affixed to and extending forwardly from a machine frame plate 44 bolted to the bed (not shown) of the machine. (Here it should be noted that the terms "forwardly", "rearwardly", "front", and "rear" are used in this description for convenience in a relative and not an absolute sense.) An armature stop plate 46 spans across the front end of the support bars 42 so that a rigid rectangular supporting framework is formed comprising the machine frame plate 44, the support bars 42 and the armature stop plate 46.

An armature core subassembly 14 to be assembled with a commutator 12 is held by a clamp assembly 48 comprising an upper, clamp jaw 50 fixed to the support bars 42 and a lower, movable clamp jaw 52 mounted on an elevator 54 driven by an air actuator 56. In operation, after a commutator 12 has been pressed onto an armature shaft 20, the elevator 54 lowers to dispense the newly-formed armature core assembly onto a conveyor or other suitable material handling device (not shown) and pick up a new subassembly 14. As the elevator 54 next rises and the new subassembly 14 approaches the upper clamp jaw 50, the subassembly 14 is rotated so that its coil-receiving slots 24 are in a predetermined angular orientation. Such rotation is caused by a pawl 58 pivotally mounted on the upper jaw 50 that enters one of the armature core slots 24 and forces the armature core subassembly 14 to rotate until the margin of another slot 24 engages a stop dog 60 affixed to the upper jaw 50. Thus, when the armature core 18 is gripped by the jaws 50 and 52, its slots 24 occupy a specified angular relationship with respect to a fixed plane containing the axis, designated 62, of the clamped armature core subassembly 14.

The presence of an angularly-oriented core in the grip of the jaws 50 and 52 may be detected by switch (not shown) operated by a spring biased switch operating rod 64. This type of detector and various other types of devices such as proximity and limit switches, are or may be employed to control the operations of machines such as the machine 40. Since they may be entirely conventional and are commonly used to sense the operations of the several parts of any machine to maintain its continued operation, no effort is made to describe or illustrate every such device, either in connection with the machine 40 or in connection with the description of the machine of this invention.

With continued reference to FIG. 2, commutators 12 pass downwardly along an inclined supply chute 66 supported by the bars 42. A pair of commutator support rails 68 are mounted on and project upwardly from the top of a commutator elevator 70 driven by an air actuator 72. In operation, the elevator 70 is elevated by the actuator 72 to position the commutator support rails 68 at the lower mouth of the commutator supply chute 66. A diagrammatically illustrated escapement device 74 then permits the lowest commutator 12 in the supply chute 66 to be lowered onto the commutator support blades 68. Upon lowering, the commutator 12 is located with the commutator support blades 68 located between respective spaced pairs of commutator tangs 28. The elevator 70, with the commutator 12 thus supported, is lowered into a position wherein the commutator 12 is centered on the armature axis 62 of the clamped armature core subassembly 14.

The commutator support rails 68 hold the commutator 12 in a tang-oriented condition wherein its tangs 28 are in a fixed angular relationship, as determined by the motor designer, relative to the same fixed plane passing through the axis 62 with respect to which the armature core slots 24 are located. At this time the commutator 12 is pushed by a commutator loading mechanism, generally designated 76, from the commutator support rails 68 into a hollow, cup-like commutator-retaining fixture or nosepiece 78 of a commutator ram assembly, generally designated 80.

The commutator loading mechanism 76 comprises an air actuator 82 mounted on the elevator 70 and connected to a inverted T-shaped carriage plate 84 by its drive rod 86. Carriage plate 84 is guided for movement along an axis parallel to the armature axis 62 by means of a pair of guide rods 87 slidable in the head of the elevator 70. Upon actuation of the actuator 82, a spring biased push rod 88 engages the confronting face of the commutator 12 and pushes it into the nosepiece 78.

In the use of the prior art machine embodiment illustrated in FIG. 2, the commutator 12 is gap-oriented while the commutator 12 is being loaded into the ram nosepiece 78. For this purpose, the nosepiece 78 is provided with a pair of gap-locating blades 90 which are sufficiently thin to enter a pilot pair of insulating air gaps 34 at diametrically opposite locations on the commutator 12. In the event the commutator 12 has tangs 28 properly located with respect to their respective bar side edges 26A, and there are no obstructions such as burrs in the pilot air gaps 34, the commutator 12 will be so located by the commutator support rails 68 that the commutator will immediately slip into the ram nosepiece 78 when the loading mechanism actuator 82 is energized. If the commutator tangs 28 are misaligned relative to the commutator bar side edges 26A or if the pilot air gaps 34 are obstructed, the commutator 12 will only partly enter the ram nosepiece 78, complete advancement of the commutator 12 into the ram nosepiece 78 being impeded by the thin, slot-locating blades 90. Failure of the push rod 88 to fully advance the commutator 12 into the ram nosepiece 78 is sensed and a rocking device, generally designated 92, is energized to rotate the commutator 12 on the commutator support rails 68 with a back and forth motion through a few degrees in each direction while the loading mechanism actuator 82 is still energized. If during this rocking motion the pilot pair of insulating air gaps 34 become aligned with the slot-locating blades 90, and providing the pilot air gaps 34 are unobstructed, the commutator will be fully loaded into the ram nosepiece 78. Failing this, the commutator 12 now only partly lowered into the ram nosepiece 78 is ejected back onto the support rails 68 and the commutator elevator 70 lowered, whereupon the commutator 12 is ejected from the rails 68 into a chute or hopper (not shown). The commutator elevator 70 and the escapement 74 recycle to take a different commutator from the chute 66 and repeat the effort, now with the new commutator, to push it fully into the ram nosepiece 78.

The rocking device 92 includes a rocking lever 94 to which the push rod 88 is affixed and which is mounted for rotation on the carriage plate 84. Lever 94 may be rotated through small angles about the axis of the push rod 88 by means of an air actuator 96 mounted on the carriage plate 84. When this occurs, an L-shaped finger 98 formed at the free end of the push rod 88 and located between a pair of tangs 28 of the commutator 12 engages the tangs and causes the commutator 12 to rock in the commutator nosepiece 78 about the armature axis 62.

The commutator ram assembly 80 comprises, in addition to the nosepiece 78, an elongate, hollow ram shaft 100 mounted on the bed of the machine and also supported by plural transverse bearing plates 104, of which two are illustrated in FIG. 2, mounted on the parallel support bars 42. The ram assembly 80 is driven along the armature axis 62 by a hydraulic actuator 106 mounted on the rear face of the frame mounting plate 44 and connected to the ram shaft 100 by means of a connector 102 that includes a yoke 102A having depending drive fingers engaged in notches on both sides of the ram shaft 100. The hydraulic actuator 106 is not rigidly connected to the ram assembly 80 to avoid the possibility that they may bind. Connector 102 will be discussed further in the next section. One or more additional bearing plates (not shown) are preferably spaced along the length of the support bars 42 to ensure that the ram shaft 100 is accurately centered with respect to the armature axis 62 at all times.

Inside the ram shaft 100, the commutator ram assembly includes an elongate, axially extending, spring biased pilot shaft 108 having a rounded forward end which can be seen within the ram nosepiece 78. Pilot shaft 108 helps to ensure that the commutator 12 is guided properly into the ram nosepiece. There is a slip fit between the commutator bore 32 and the pilot shaft 108 so that the commutator 12 will not become cocked or wobble out of its intended position when it is being loaded into the ram nosepiece 78 and remain, without wobbling, axially aligned with the armature shaft 20 as it advances toward the same in the manner to be described below.

Also inside the ram shaft 100 there is a commutator ejecting sleeve (not shown) against which abuts a commutator 12 which has been fully loaded into the ram nosepiece 78. To eject an incompletely loaded commutator 12, the ejecting sleeve is driven forwardly by a transverse ejector operator 110 extending through elongated, longitudinally extending slots 112 in the ram shaft 100. Only the nearest slot 112 bordering the ejector operator 110 can be seen in FIG. 2, the forwardly extending portion of which is covered by an ejector return spring 114. Of course, the other slot 112 is on the side of the ram shaft 100 that is not shown. The ejector operator 110 is biased rearwardly by the ejector return spring 114 which is confined between the ejector operator 110 and a split ram stop collar 116 threadedly connected and clamped in an adjusted location on the ram shaft 100 forwardly of the ejector operator 110. As believed apparent, forward movement of the ejector operator 110 relative to the ram shaft 100 causes the commutator ejecting sleeve to engage the rearward end of the partly loaded commutator 12 and eject it. Such forward motion of the ejector operator 110 is accomplished by an air cylinder-driven linkage which is not illustrated for the sake of simplifying this disclosure and since it is unimportant in relation to the present invention. Parts of the ram assembly internal of the ram shaft of the machine of this invention may be identical to those within the ram shaft 100 and are described in the next section.

To ensure that the commutator 12 in the ram nosepiece 78 is retained in a fixed angular orientation at all times, the ram shaft 100 is provided with a longitudinally extending keyway 118 in which is engaged an elongate key 120 held by and extending between the two illustrated transverse bearing plates 104.

In operation of the prior art machine 40, after a commutator 12 is fully inserted in the ram nosepiece 78, the commutator elevator 70 is lowered whereupon the ram assembly 80 is driven forwardly by the hydraulic actuator 106 until the ram stop collar 116 engages a ram stop 122 mounted on the rear face of a ram stop mounting plate 123 that is fixed to the bed of the machine. Near the end of this forward movement, the pilot shaft 108 engages and is stopped by the armature shaft 20, causing spring means (not shown) which biases the pilot shaft 108 forwardly to be compressed. As other parts of the ram assembly 80 continue to move forwardly, the commutator 12 is stripped off the pilot shaft 108 and then pressed onto the armature shaft 20. The force applied to the armature core subassembly 14 tending to push it forwardly is resisted by an adjustable armature stop 124 mounted on the armature stop plate 46.

Upon completion of the forward movement of the ram shaft 100, the commutator 12 is fully pressed onto the armature shaft 10. The angular orientation of the commutator 12 relative to the armature core slots 24 is determined by the fact that the commutator 12 is gap-oriented within the ram nosepiece 78. A proper axial location of the commutator 12 relative to the armature core 18 may be determined by appropriate adjustment of the adjustably-mounted armature stop 124 and the spacing of the ram stop collar 116 relative to the ram stop 122.

Upon the initial subsequent return movement of the ram shaft 100, the pilot shaft 108 remains engaged with the armature shaft 20, biasing it forwardly, and thereby resisting any tendency the ram nosepiece 78 may have to frictionally pull the assembled commutator 12 rearwardly. Such tendency may also be prevented by a suitable stop (not shown). Upon continued movement of the ram shaft 100 rearwardly, the pilot shaft 108 is pulled away from the armature shaft 20 and the ram shaft returns to its retracted position shown in FIG. 2. The assembled armature core assembly is then lowered by operation of the armature elevator 54. All parts are in readiness to assemble a different commutator 12 onto a different armature subassembly 14.

FIG. 3 shows another prior art commutator-retaining fixture or ram nosepiece, generally designated 130, which has been used when the tang-orientation of a commutator placed on the support rails 68 is to be maintained. The ram nosepiece 130 has externally located pockets 132 in its forward end that receive and locate the commutator tangs 28 as the commutator is loaded therein. In some cases, the pockets 132 in the prior ram are completely cut out, leaving slots between forwardly projecting pins or fingers in which the tangs are located. This type of construction, and additional details of the nosepiece and other parts associated with a ram assembly are further discussed below with reference to FIGS. 7 and 8. Nosepieces of these types have commonly been used with machines similar to the machine 40 of FIG. 2. However, machines which rely on tang-orientation are not equipped with a rocking mechanism 92 since the alignment of the commutators tangs by the use of supporting rails, such as the rails 68, is sufficient.

Although the machine 40 represents an improvement in the art of commutator placing machines, useful whenever it is desired to orient the side edges of the commutator bars with the armature core slots with greater accuracy than can be obtained by tang orientation alone, it is not without technical drawbacks. In use, there are occasions when a substantial percentage of commutators are ejected from the ram nosepiece 78. This is costly, not only in regard to the cost of otherwise usable commutators that must be discarded, but also in regard to the lost production resulting from the time taken to operate the ejection mechanism and recycle the commutator elevator 70, the escapement 74, and the commutator loading mechanism 76. Another drawback to the machine 40 illustrated in FIG. 2 is that the slot-locating blades 90 are so thin that they are easily broken. When this occurs, a defectively aligned commutator 12 may more readily enter the ram nosepiece 78, with the result that a defective armature may be built. It is not easy to detect a broken blade 90, so it occasionally happens that numerous defective commutators may be produced before the problem is recognized.

THE INVENTION

Referring to FIG. 4, a machine in accordance with this invention is generally designated 140. Substantial similarities may be noted between the machine 140 and the machine 40 of FIG. 2. Thus, machine 140 has a supporting framework formed corresponding to the framework of the machine 40 formed from a machine frame plate 144 affixed to the bed of the machine, a pair of parallel, horizontal support bars 142 affixed to and extending forwardly from the frame plate 144, and an armature stop plate 146. Certain operating assemblies of the machine 140 of this invention may also be identical or substantially identical to corresponding parts of the prior art machine 40. Thus, the machine 140 of this invention has an armature clamp assembly 148 and an armature elevator 150 which locate and retain an armature core subassembly 14 centered on an axis 151 and which may be made and function identically to the corresponding parts 48 and 54 of the machine 40 of FIG. 2. The machine 140 of this invention may also use a commutator supply chute 152 and an escapement device 154 which can be identical to the chute 66 and the escapement device 74 of the prior machine 40. A commutator elevator 156 having commutator support rails 157 is used for the same purpose as the elevator 70. (Except for the angle at which the commutators are oriented by the construction of the support rails 157, as will be described below, the elevator 156 may be essentially identical to the elevator 70 described above.) The machine 140 of this invention also has a commutator loading mechanism 158 for loading a commutator 12 into a commutator-retaining fixture or ram nosepiece 160 mounted on a hollow ram shaft 162 of a novel ram assembly, generally designated 164. For reasons which will become apparent, the commutator loading mechanism 158 is or may be the same as other prior commutator loading mechanisms and does not have a rocking mechanism such as the mechanism 92 of the machine of FIG. 2. Since the machine 140 of this invention may incorporate the above-mentioned mechanisms and assemblies, or variants thereof, all of which (with the exception of the ram assembly 164 and the support rails 157) may be entirely conventional, such mechanisms and assemblies are not illustrated or described in further detail herein.

In accordance with the preferred practice of this invention, the ram nosepiece 160 is centered on the armature axis 151 and oriented relative to the armature core slots 24 with its tang-receiving pockets in a predetermined angular orientation relative to the armature core slots 24 and a tang-oriented commutator is loaded into the ram nosepiece 160 and held non-rotationally therein. With the ram nosepiece 160 and the commutator 12 thus centered on the armature axis 151 in tang-oriented fashion, the ram nosepiece 160 is rotated about the armature axis 151 relative to the clamped armature core subassembly 14 while the relative orientation of the armature core subassembly 14 and a side edge 26A of a commutator bar 26 is monitored. When the desired relative orientation is reached, the relative rotation is stopped and the ram assembly 164 is advanced to press the commutator 12 onto the armature core subassembly 14.

The preferred method of relatively rotating the ram nosepiece 160 and the armature core subassembly 14 in order to obtain a bar edge-oriented alignment is to rotate the ram assembly 164 while maintaining the armature core subassembly 14 clamped in fixed position by the armature clamp assembly 148. To this end, and with reference to FIGS. 4, 5 and 6, the ram assembly 164 is supported for rotary movement as well as axial movement by plural transverse bearing plates, of which two, designated 170 and 172, are illustrated. The ram assembly 164 is axially moved by a hydraulic actuator 174 mounted on the frame mounting plate 144 by a mounting bracket 176. The hydraulic actuator 174 has a piston rod 178 connected to the ram shaft 162 by means of a coupling, generally designated 180, that permits of relative rotation between the piston rod 178 and the ram shaft 162 while preventing substantial relative axial movement therebetween. Coupling 180 includes an inverted U-shaped drive yoke 182 connected by screws 184 to a mounting block 186 which is threadedly connected to the free end of the piston rod 178. The drive yoke 182 has a pair of mutually-spaced, depending legs 188 located within an annular groove 190 formed in the outer surface of the ram shaft 162 adjacent its rearward end. As is believed apparent, the drive yoke legs 188 are located in the ram shaft groove 190 to provide a non-binding axial driving connection between the hydraulic actuator 174 and the ram assembly 164. Because the yoke legs 188 are in the annular groove 190, the ram assembly 164 is free to rotate relative to the hydraulic actuator 174. This driving connection differs from the connection of the yoke 104 of the prior machine 40 only in that the prior ram shaft 100 had vertical grooves instead of the annular groove 190 since there was no need to provide for relative rotation between the ram shaft assembly 80 and the hydraulic actuator 106 of the prior machine 40.

The ram shaft 162, and accordingly the ram nosepiece 160, are rotated about the armature axis 151 by an incremental or stepper drive motor 194 mounted on a vertically extending motor support plate 196 attached to the support bars 142 by a monitor and motor mounting assembly, generally designated 198. The precise construction of the mounting assembly 198 is unimportant for the purposes of this invention and is accordingly not illustrated in detail. Briefly, it includes a pair of mounting pads 200, only one of which may be seen (in FIG. 5), there being one mounting pad 200 bolted to each support bar 142. The mounting assembly 198 further includes a vertically upwardly extending main mounting plate 202 welded to the mounting pads 200 and spanning between them. A large section of the main mounting plate 202 is cut away at 204 to enable an operator or mechanic to better observe the relationship of the parts. The motor support plate 196 is connected by a spacer or support block 206 mounted on the back of the main mounting plate 202.

The output shaft of the stepper drive motor 194 has a drive gear 208 that drivingly rotates the ram shaft 162 through an axially fixed, rotary motion transfer assembly, generally designated 210, comprising a drive gear segment 212 having an outer, circularly arcuate periphery provided with gear teeth 213 meshed with the drive gear 208. The center of the radius of curvature of the gear segment 212 coincides with the armature axis 151 and the ram shaft 162 is keyed to the drive gear segment 212 for rotation therewith about the armature axis 151. For this purpose, the ram shaft 162 has plural, circumferentially-spaced and longitudinally-extending splines 214 along a substantial portion of its length and the drive gear segment 212 has a splined, circular bore 216 centered on the axis 151 and meshing with the ram shaft splines 214.

To confine the drive gear segment 212 for movement in a path that is perpendicular to the armature axis 151, and to ensure an accurate and positive driving connection between the drive motor 194 and the ram shaft 162, the rotary motion transfer assembly 210 further comprises a follower plate 218 parallel to the drive gear segment 212 and rigidly connected thereto by a spacer plate 220. The follower plate 218 is also keyed to the ram shaft 162 by means of a splined circular bore 222 centered on the armature axis 151 and meshing with the ram shaft splines 214. The drive gear segment 212 and the follower plate 218 straddle the transverse bearing plates 170 and 172 from which they are separated by thin bearing plates 224 and which prevent axial movement of the rotary motion transfer assembly 210.

The preferred method of monitoring the side edge 26A of a commutator bar 26 for control of the stepper drive motor 194 is by means of an optical edge-detection camera or gauge 226 mounted on the front face of the main mounting plate 202 and having a lens portion 228 centered on an axis 230 perpendicular to the armature axis 151 and intersecting the surface of a commutator 12 in the ram nosepiece 160. The gauge 226 is programmed to provide signals indicative of the presence or absence of a bar side edge 26A at a particular location within its field of view, which signals are used to control the operation of the stepper motor 194, as will be more fully discussed below. For this purpose, the ram nosepiece 160 has a circular bore or camera sight window 232 centered on the lens axis 230 which exposes an area of the outer surface of the commutator 12 located within the nosepiece 160.

Although there may be other acceptable gauges, a high resolution linear array camera or optical gauge is presently preferred. A linear array device is presently preferred over a two dimensional vision system because of its relatively low cost and fast response time. An optical gauge designated as Honeywell HVS 256 and available from Honeywell Visitronics, P.O. Box 5077, Englewood, Colo. 80155, is highly acceptable. When provided with a 25 mm lens and mounted so that its lens is located three inches from a commutator 12 in the ram nosepiece 160, the Honeywell HVS 256 has a sufficiently high resolution to detect a commutator bar edge 26A with an accuracy of approximately 0.0004 inch. (Of course, the accuracy of the entire system would be somewhat less.)

Figure 8:
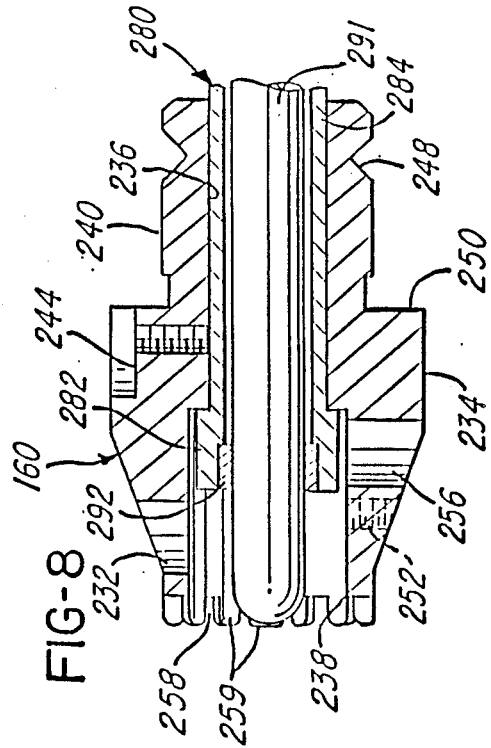
FIG. 8 is a cross sectional view of the ram nosepiece of FIG. 7 and further includes a fragmentary cross sectional view of a commutator ejecting sleeve of the machine of FIG. 4.
Figure 7:
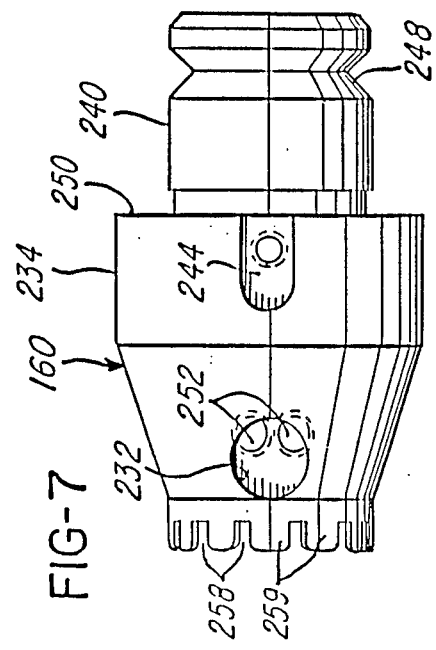
FIG. 7 is a top plan view of a ram nosepiece forming part of the machine of FIG. 4.

Except for the sight window 232, the nosepiece 160 may be of an entirely conventional construction, which will now be described. With reference to FIGS. 5, 7, and 8, the nosepiece 160 comprises a generally cylindrical body 234 with a through bore 236. The forward end of the through bore 236 is counterbored to form a commutator-receiving cavity or pocket 238. The rearward end of the body 234 comprises a reduced diameter hub portion 240 received within the forward end of the ram shaft 162. A rectangular key 242 (FIG. 5) bears against a keyway 244 on the nosepiece body 234 and a cooperating keyway on the ram shaft 162 to secure the nosepiece 160 against rotation relative to the ram shaft 162. Relative axial movement between the ram nosepiece 160 and the ram shaft 162 is prevented by a set screw 246 (FIG. 5) that bears against a forwardly facing surface of a V-shaped circular groove 248 in the hub portion 240 so that a rearwardly facing shoulder 250 o the body 234 bears against the front end face of the ram shaft 162.

As also old in the art, the body 234 has a pair of tapped holes 252 that threadedly receive ball plungers 254 of the type sold by Reid Tool Supply Company of Muskegon, Michigan which frictionally retain a commutator 12 loaded into the cavity 238. A downwardly extending bore 256 opening from the cavity 238 to the bottom of the body 234 is provided to permit any debris that may otherwise accumulate in the cavity 238 to drop away when each successive commutator 12 is loaded into the nosepiece 160.

As in the case of the nosepiece 130 of FIG. 3, and in contrast to the nosepiece 78 of FIG. 2, the leading edge of the nosepiece 160 bar has tang-receiving pockets 258 for tang-orienting the commutator 12 cooperates with its associated commutator loading mechanism 158 to tang-orient the commutator 12. Thus, the pockets 258 could be formed in the same manner as the pockets 132 of FIG. 3, but in this case are shown as slots between forwardly-extending fingers 259 that have rounded edges which receive the commutator tangs with a slip fit.

In the preferred method of operation of the machine 140 of this invention, the commutator support rails 157 on the elevator 156 are constructed to hold and locate a commutator 12 in an angular position wherein one of its bars 26' is in an uppermost or twelve o'clock position with part of its upper·surface facing vertically upwardly. The commutator 12 is also so located by the commutator support rails of the commutator elevator 156 that its angular orientation is most likely to be slightly out of alignment with the desired final orientation of its tangs 28 with the commutator slots 24. The intentional misalignment may be accomplished, for example, by making one of the commutator support rails 157 slightly taller than the other. (This is the only difference between the commutator elevator 156 of this invention and prior art elevators which tang-orient the commutators as they would be finally oriented relative to the armature core slots.) With the commutator 12 thus tang-oriented, it is loaded into the ram nosepiece 160, the tang receiving slots or pockets 258 of which must be out of angular alignment with the armature core slots 24 by the same number of degrees as the commutator 12 is oriented out of alignment with the armature core slots by the support rails of the commutator elevator 156. The uppermost commutator bar 26' is thereby located in line with the camera sight window 232 in confronting relation to the camera lens 228. The commutator elevator 156 is then lowered out of the way.

With the edge gauge 226 monitoring the uppermost commutator bar 26' exposed by the sight window 232 as illustrated in FIG. 9, the stepper drive motor 194 is energized to rotate the ram shaft 162 and thereby the ram nosepiece 160 and the commutator 12 lodged therein in a clockwise direction as viewed in FIGS. 4, 9, and 10, and in a "top coming" direction as viewed in FIG. 5, until a side edge 26A of the monitored commutator bar 26' is detected by the gauge 226 to be located at a position in the field of view of the gauge lens 228 wherein it has been predetermined to be properly bar edge-oriented with respect to the armature core slots 24. This is the position diagrammed in FIG. 10, the direction of rotation of the commutator 12 to reach such position being indicated by an arrow A therein.

Figure 11:
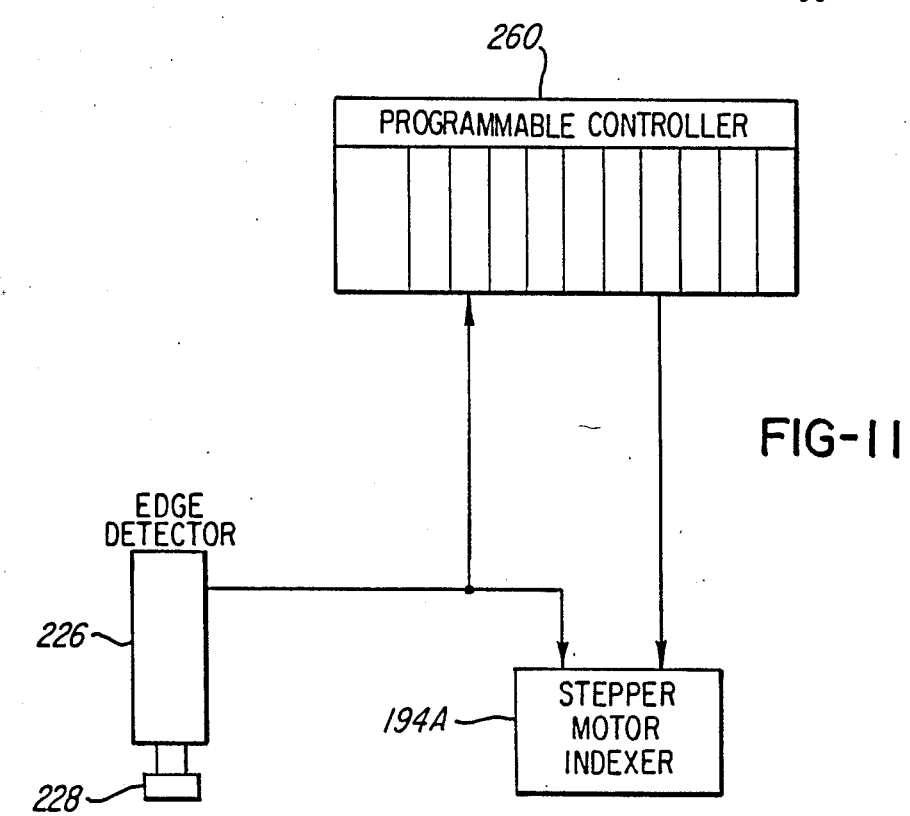
FIG. 11 is a simplified diagrammatic illustration of a portion of a machine control circuit applicable to the machine of FIG. 4.

FIG. 11 is highly simplified schematic of the machine control circuitry used to control the stepper drive motor 194 by means of a programmable controller 260, a stepper motor indexer 194A, and the edge gauge 226. Note that signals from the gauge 226 are used by the programmable controller 260 to maintain the stepper drive motor 194 energized. When the edge gauge detects a side edge 26A of the commutator bar 26' being monitored, the signal produced by the edge gauge 226 is applied directly to the stepper drive motor 194, as in the form of an interrupt, to deenergize it and thus stop the rotation of the ram shaft 162 with the commutator 12 in the nosepiece 160 properly bar edge oriented relative to the armature core slots 24. The same signal from the edge gauge 226 may be used by the programmable controller 260 to initiate other events, such as the energization of the hydraulic actuator 174 to move the ram assembly 164 forwardly toward the armature core subassembly 14 clamped by the armature clamp assembly 148.

When the hydraulic actuator 174 is energized subsequent to the bar edge-orientation of the commutator 12 to drive the ram assembly 164 toward the armature core subassembly 14 so that the commutator 12 lodged in the ram nosepiece 160 is pressed onto the armature shaft 20, the movement of the ram assembly continues until a stop collar 262 clamped in an adjusted position to the ram shaft 162 strikes a stop plate 264 mounted on the backside of a ram stop mounting plate 265 fixed to the machine bed. This extreme forward movement of the ram assembly 164 is sensed, as by a limit switch (not shown), and the hydraulic actuator 174 is then energized to return the ram assembly 164 to its rearward or home position.

During the return movement of the ram assembly 164, the programmable controller 260 energizes the stepper drive motor 194 to reversely rotate the ram shaft 162 in a counterclockwise direction as viewed in FIG. 4 and as "top going" as viewed in FIG. 5, to return it to its original angular start or home position so that, again, the tang receiving slots or pockets in the ram nosepiece 160 are slightly angularly misaligned from their desired ultimate bar-oriented location. The operations described above may then be repeated indefinitely to press other commutators 12 onto other armature core subassemblies 14.

The angular home position of the ram nosepiece 160 may be adjustably set by the use of an adjustably mounted sensing device that senses the location of the drive gear segment 212 in the home position. One such sensing device, comprising a proximity detector 266 adjustably mounted on a switch mounting plate 268 connected to the main mounting plate 202, is shown in FIGS. 4 and 5. Also mounted on the switch mounting plate 268 for association with the proximity detector 266 is an adjustably fixed mechanical stop pin 270 which positively prevents excessive overtravel of the drive gear segment 212 past its angular home position in the event rotation of the drive gear segment 212 is not interrupted due to failure of the proximity detector 266 or failure of other circuit components which might result in damage to the proximity detector 266 or other parts of the machine.

The degree by which the tang-oriented commutator 12 is initially angularly misaligned is a matter of choice but, for speed of operation, it is preferred that the misalignment be quite small and in every case less than the width of one commutator bar. Preferably, the degree of misalignment is only sufficient for the tolerance range to be accommodated. This would usually be statistically determined. If, for example, the tangs of a particular type of commutator are designed to be centered on the centerlines of the commutator bars but from experience it is known that they are off-centered by as much as three degrees in either direction, an initial misalignment of the tangs by four degrees in one direction would accommodate all but those commutators which have tangs misaligned by an amount greater than four degrees in that direction. In most, if not all cases, the bar edge-orientation would be obtained by rotation of the ram assembly 164 between one degree and seven degrees. Thus, with reference to FIGS. 9 and 10, if the tang of the bar 26' is closer to its edge 26A than to its centerline, the commutator 12 would be inserted into the ram nosepiece 160 with its bars displaced in a clockwise direction from that illustrated in FIGS. 9, so that a lesser degree of rotation of the ram nosepiece 160 would be required to center the edge 26A under the camera or gauge 226 as shown in FIG. 10. Conversely, if the tang were further from the edge 26A, the commutator would be inserted into the ram nosepiece 160 displaced in a counterclockwise direction from that illustrated in FIGS. 9, so that a greater degree of rotation of the ram nosepiece 160 would be required to center the edge 26A under the camera or gauge 226 as shown in FIG. 10.

The programmable controller 260 may be programmed to cause the commutator to be ejected in the event the edge detector 226 fails to signal that a bar edge has been located after a predetermined number of degrees of rotation of the ram assembly 164. This would ordinarily mean that either there are no insulating slots in the commutator or that the tangs are so far out of alignment that it may not be possible to carry out subsequent manufacturing operations. At the same time, the eject mechanism could be operated to eject the defective commutator. A proximity detector and an adjustably fixed stop (not shown) similar to the proximity detector 266 and the stop 270 could be provided for this purpose on the right side of the gear segment 212 as viewed in FIG. 4, opposite from the detector 266 and the stop 270.

An advantage of the use of a programmable optical edge detector such as the Honeywell HVS 256 unit mentioned above is that it may be programmed to react to a commutator edge 26A at some location other than that initially used. For example, if by use of statistical process control techniques it is determined that the commutators would statistically be better angularly aligned if they are rotated through an additional 0.5 degree past the initially detected edge location, the edge detector 226 may be reprogrammed to cause such additional rotation to occur.

Figure 6:
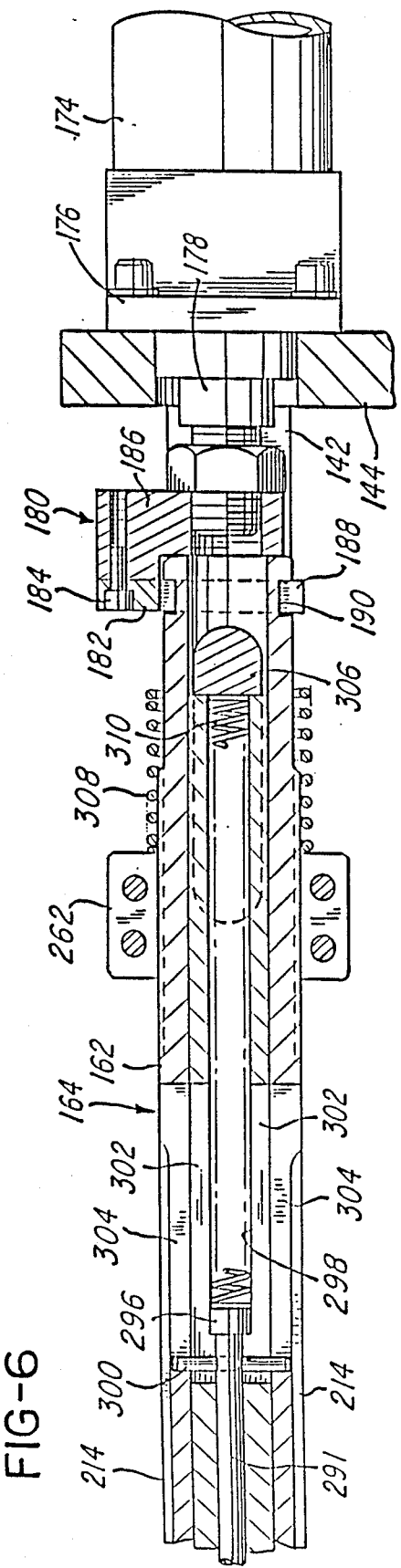
FIG. 6 is a fragmentary cross sectional view of another portion of the assembly machine of FIG. 4 adjacent to the portion of the machine shown in FIG. 5.

FIGS. 5, 6, and 8 show internal parts of the ram assembly 164 which have not been previously described. These include a hollow commutator ejecting sleeve 280 having a pressing head 282 located within the ram nosepiece cavity 238 and an elongate shank portion 284 which is of a smaller diameter than its pressing head 282 and which extends through and rearwardly past the nosepiece hub portion 240. An ejecting sleeve return spring 286 encircling the shank portion 284 and confined between the rearwardly facing end of the nosepiece hub portion 284 and a retaining washer 288 at the rear end of the shank portion 284 so biases the ejecting sleeve 282 that its pressing head 282 abuts the forwardly facing base surface of the ram nosepiece cavity 238. In operation, a commutator 12 fully loaded into the ram nosepiece 160 abuts the forwardly facing surface of the pressing head 282. Accordingly, when ram shaft 164 is moved forwardly by the hydraulic actuator 174, the force required to press the commutator 12 onto the armature shaft 20 is transmitted through the pressing head 282 to the commutator 12.

Slidable within the bore of the ram shaft 162 aft of the ejecting sleeve 280 is an elongate, hollow ejector drive shaft 290 within which is slidably mounted a pilot shaft 291. The forward end of the pilot shaft 291 projects into the nosepiece cavity 238 through the ejection sleeve 280 within which it is centered by bearing collars 292 and 294. The pilot shaft 291 has an enlarged head 296 within an elongate counterbore 298 at the rearward end of the ejector drive shaft 290. A stop and alignment pin 300 passes transversely through the pilot shaft 291 and also through diametrically opposed slots 302 in the ejector drive shaft 290 into diametrically opposed slots 304 in the ram shaft 162 aligned with the slots 302. Forward movement of the pilot shaft 291 is limited by the engagement of the stop and alignment pin 300 with the rearwardly facing end surfaces of the ram shaft slots 304.

The ejector drive shaft 290 is fixedly connected to the transverse ejector operator, designated 306, which is biased rearwardly with respect to ram shaft 162 by an ejector return spring 308 located between the ejector operator 306 and the stop collar 262. A pilot shaft return spring 310 is confined within the counterbore 298 between the pilot shaft head 296 and the transverse ejector operator 306.

If due to some defect, commutator 12 is only partly loaded into the ram nosepiece 160, the failure of the commutator loading mechanism 158 to complete its operation is sensed and an ejection drive cylinder (not shown) caused to operate. Operation of the latter cylinder causes, by means of a suitable linkage (not shown), the transverse ejector operator 306 to be driven forwardly against the bias of the ejector return spring 308 .whereupon the ejector drive shaft 290 moves forwardly into engagement with the ejecting sleeve 280, moving it forwardly against the bias of the ejecting sleeve return spring 286 to eject the defective commutator onto the commutator support rails 157. Upon subsequent release of pressure against the transverse ejector operator 306, the ejector return spring returns the ejector drive shaft 290 and the tranverse ejector operator 306 to their rearward or home positions and the sleeve return spring 286 also returns the ejecting sleeve 280 to its rearward or home position.

As the ram shaft 162 advances toward the armature core subassembly 14, and the pilot shaft 180 engages the end of the armature shaft 20, the pilot shaft return spring 310 is placed under pressure so that, upon initial subsequent return of the ram shaft 162, the pilot shaft 291 will press against the armature and resist any frictional force between the newly placed commutator and the returning ram nosepiece 160 tending to pull the armature assembly rearwardly. As previously mentioned with respect to the prior machine 40, stop means may also be provided for this purpose.

Since the loading of an armature core subassembly 14 in the armature core clamp assembly 148 may occur essentially simultaneously with the loading and the bar edge-orientation of a commutator 12, it will be appreciated that the machine 140 of this invention may operate with considerable speed. Contributing to the high speed of operation is the process by which the return of the ram nosepiece 160 to its angular start position by reverse rotation of ram assembly 164 may be accomplished while the ram assembly 164 is returning to its axially retracted home position and the minimal angle through which the ram nosepiece must be rotated to bar edge orient the commutator. Highly accurate and uniformly repeatable locations of the commutator bar edges with the armature slots are obtainable by the machine of this invention which in many cases may provide greater armature reliability than can be obtained by commutator placing machines which rely solely on tang-orientation. Because the location of an edge is being detected, the accuracy of bar edge-orientation in accordance with this invention is greater than with the gap-orientation obtained by the use of the machine 40 because of the need for the thin gap-locating blades 90 to be thinner than the air gaps 34 that receive them. The ability to make changes in the edge location of the edge detected by changing the edge detector program may also provide substantial advantages in some cases.

Those skilled in the art will recognize that this invention may also be usable for placing commutators having wire lead receiving slots instead of tangs, in which case the commutator would first be oriented by such slots instead of the tangs. There also may be occasions in which an edge other than a commutator bar edge, such as an edge of a wire lead receiving slot or an edge of a line marked on a commutator bar, would be detected and used to control the relative angular orientation of a commutator and an armature core subassembly.

Cases may arise when it would be preferable to rotate the armature rather than the commutator and it would be possible to use an optical or other edge detector to determine the error between the relative positions of a tang-oriented commutator and the nominal orientation of an armature core when clamped by the armature clamp assembly as determined by a stop dog in an armature core slot, and to position or reposition the armature core subassembly to compensate for the error. The armature positioning or repositioning could be accomplished by moving the armature stop dog on the clamp assembly either before or after an armature is located in the armature clamp assembly. The error in the edge position can be detected by the operation of the edge detector or, as in the case of the machine 140, by rotation of the commutator relative to the edge detector.

Although a high resolution optical edge detector is the present choice for detecting the location of the edge of a commutator bar, other electrical or mechanical devices may be usable for this purpose.

Although the presently preferred embodiment of this invention has been described, it will be understood that within the purview of the invention various changes may be made within the scope of the following claims.

We claim:

1. A method for aligning a commutator relative to an armature core mounted on an armature shaft in preparation for placing the commutator onto the armature shaft utilizing a commutator placing ram having a commutator-receiving fixture at one end thereof that non-rotatably receives a commutator and positions said commutator with its center axis aligned with the axis of movement of said ram, said method comprising the steps of:
   supporting an assembled armature core and armature shaft in axial alignment with said fixture;
   positioning a tang-oriented commutator within said fixture;
   detecting the angular distance of an edge of a commutator bar of said commutator relative to a predetermined reference position; and
   bar edge-orienting said commutator relative to said core by rotating said fixture relative to said core through an angle equal to said detected angular distance.

2. The method of claim 1 wherein said bar-edge orienting step is accomplished by relatively rotating an edge detector and said commutator until an edge of a bar of the commutator is detected at a predetermined location and rotating said commutator relative to said armature core through the same angle.

3. The method of claim 2 wherein said relative rotation of said edge detector and said commutator and said relative rotation of said commutator and said armature core are accomplished by maintaining said edge detector and said armature core in a fixed position and rotating said commutator.

4. A method for aligning a commutator relative to an armature core mounted on an armature shaft in preparation for placing the commutator onto the armature shaft utilizing a commutator placing ram having a commutator-receiving fixture at one end thereof that non-rotatably receives a commutator and positions said commutator with its center axis aligned with the axis of movement of said ram, said method comprising the steps of:
   supporting an assembled armature core and armature shaft in axial alignment with said fixture;
   positioning a commutator within said fixture with the bars of said commutator circumferentially displaced relative to said armature core from the optimum relative rotary positions thereof by an angle less than the angle between opposite edges of each of said commutator bars;
   determining the angle of said displacement; and
   relatively rotating said fixture and said core about said axis through an angle equal to the determined angle of said displacement to reach said optimum relative rotary positions.

5. The method of claim 4 wherein said step of determining the angle of said displacement is accomplished by rotating said fixture about said axis until an edge of one of the bars of said commutator is in a predetermined position.

6. The method of claim 5 wherein said predetermined position is sensed by an optical gauge.

7. The method of claim 6 wherein said step of relatively rotating said armature core and said commutator is accomplished by rotating said commutator while maintaining said armature core clamped in an axially and angularly fixed position.

8. The method of claim 7 wherein said commutator is rotated by a stepper motor and said optical gauge produces a signal to deenergize said stepper motor when said edge reaches said predetermined position.

9. The method of claim 8 wherein said fixture is located in an angular home position before rotation of said fixture to reach said optimal orientation, and said fixture is rotated back to said home position after a commutator is placed on an armature shaft in preparation for receiving another commutator to be placed on another armature shaft.

10. A commutator placing method comprising the steps of: aligning a commutator relative to an armature core mounted on an armature shaft in preparation for placing the commutator onto the armature shaft utilizing a commutator placing ram having a commutator-receiving fixture at one end thereof that non-rotatably receives a commutator and positions said commutator with its center axis aligned with the axis of movement of said ram, said aligning being accomplished by the steps of:

supporting an assembled armature core and armature shaft in axial alignment with said fixture, positioning a tang-oriented commutator within said fixture, detecting the angular distance of an edge of a commutator bar of said commutator relative to a predetermined reference position, and bar edge-orienting said commutator relative to said core by rotating said fixture relative to said core through an angle equal to said detected angular distance; and pressing said commutator onto said armature shaft.

11. The method of claim 10 wherein said bar-edge orienting step is accomplished by relatively rotating an edge detector and said commutator until an edge of a bar of the commutator is detected at a predetermined location and rotating said commutator relative to said armature core through the same angle.

12. The method of claim 11 wherein said relative rotation of said edge detector and said commutator and said relative rotation of said commutator and said armature core are accomplished by maintaining said edge detector and said armature core in a fixed position and rotating said commutator.

13. A commutator placing method comprising the steps of: aligning a commutator relative to an armature core mounted on an armature shaft in preparation for placing the commutator onto the armature shaft utilizing a commutator placing ram having a commutator-receiving fixture at one end thereof that non-rotatably receives a commutator and positions said commutator with its center axis aligned with the axis of movement of said ram, said aligning being accomplished by the steps of:

supporting an assembled armature core and armature shaft in axial alignment with said fixture; positioning a commutator within said fixture with the bars of said commutator circumferentially displaced relative to said armature core from the optimum relative rotary positions thereof by an angle less than the angle between opposite edges of each of said commutator bars;

determining the angle of said displacement; and relatively rotating said fixture and said core about said axis through an angle equal to the determined angle of said displacement to reach said optimum relative rotary positions; and pressing said commutator onto said armature shaft.

14. The method of claim 13 wherein said step of determining the angle of said displacement is accomplished by rotating said fixture about said axis until an edge of one of the bars of said commutator is in a predetermined position.

15. The method of claim 14 wherein said predetermined position is sensed by an optical gauge.

16. The method of claim 15 wherein said step of relatively rotating said armature core and said commutator is accomplished by rotating said commutator while maintaining said armature core clamped in an axially and angularly fixed position.

17. The method of claim 16 wherein said commutator is rotated by a stepper motor and said optical gauge produces a signal to deenergize said stepper motor when said edge reaches said predetermined position.

18. The method of claim 17 wherein said fixture is located in an angular home position before rotation of said fixture to reach said optimal orientation, and said fixture is rotated back to said home position after a commutator is placed on an armature shaft in preparation for receiving another commutator to be placed on another armature shaft.

19. A method for aligning a commutator relative to an armature core mounted on an armature shaft in preparation for placing the commutator onto the armature shaft utilizing a commutator placing ram mounted on a framework and having a commutator-receiving fixture at one end thereof that non-rotatably receives a commutator and positions said commutator with its center axis aligned with the axis of movement of said ram, said method comprising the steps of:

supporting an assembled armature core and armature shaft in axial alignment with said fixture;

positioning a tang-oriented commutator within said fixture; and rotating said fixture relative to said core and said framework to bar edge-orient said commutator relative to said core.

* * * * *